(12) United States Patent
Peeters

(10) Patent No.: US 9,549,447 B2
(45) Date of Patent: Jan. 17, 2017

(54) LED LIGHTING CIRCUIT

(71) Applicant: PHILIPS LIGHTING HOLDING B.V., Eindhoven (NL)

(72) Inventor: Henricus Marie Peeters, Baarlo (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/888,833

(22) PCT Filed: Apr. 21, 2014

(86) PCT No.: PCT/EP2014/058035
§ 371 (c)(1),
(2) Date: Nov. 3, 2015

(87) PCT Pub. No.: WO2014/177409
PCT Pub. Date: Nov. 6, 2014

(65) Prior Publication Data
US 2016/0081145 A1    Mar. 17, 2016

(30) Foreign Application Priority Data
May 3, 2013   (EP) ..................................... 13166445

(51) Int. Cl.
H05B 37/02      (2006.01)
H05B 33/08      (2006.01)
A01G 9/20       (2006.01)

(52) U.S. Cl.
CPC ............... *H05B 33/086* (2013.01); *A01G 9/20* (2013.01); *H05B 33/0812* (2013.01); *H05B 33/0827* (2013.01)

(58) Field of Classification Search
CPC ............. H05B 33/0812; H05B 33/0815; H01L 2924/00
(Continued)

(56) References Cited
U.S. PATENT DOCUMENTS
2007/0171146 A1   7/2007   Lee et al.
2007/0171159 A1   7/2007   Lee
(Continued)

FOREIGN PATENT DOCUMENTS
DE    102011009697 A1    8/2012

*Primary Examiner* — Don Le

(57) ABSTRACT

The invention describes a lighting circuit (1) comprising a primary set (11, 13) of light-emitting diodes (110, 130) of a first color and a secondary set (12) of light-emitting diodes (120) of a further color; wherein a temperature-dependent reduction in light output of the primary set (11, 13) of light-emitting diodes (110, 130) is greater than a temperature-dependent reduction in light output of the secondary set (12) of light-emitting diodes (120); and a flux ratio fixing arrangement realized to maintain an essentially constant ratio between the light output of the primary set (11, 13) and the light output of the secondary set (12) during a temperature-dependent overall reduction in light output of the light-emitting diodes (110, 120, 130) of the lighting circuit (1). The invention also describes a lighting arrangement (4, 4') for illuminating objects (40, 41) with light of a predefined color point, which lighting arrangement (4, 4') comprises at least one such lighting circuit (1), wherein the light-emitting diode sets (11, 12, 13) of a lighting circuit (1) are chosen to emit, in combination, light of the predefined color point at an initial temperature, and wherein the flux ratio fixing arrangement of the lighting circuit (1) is realized to maintain that color point at a temperature higher that the initial temperature.

15 Claims, 9 Drawing Sheets

(58) Field of Classification Search
USPC .......................................................... 315/294
See application file for complete search history.

(56) References Cited

U.S. PATENT DOCUMENTS

| | | |
|---|---|---|
| 2009/0033612 A1 | 2/2009 | Roberts et al. |
| 2010/0019693 A1* | 1/2010 | Hoogzaad .......... H05B 33/0815 315/294 |
| 2011/0115406 A1* | 5/2011 | Wang ................ H05B 33/0812 315/294 |
| 2011/0241572 A1 | 10/2011 | Zhang et al. |
| 2012/0139544 A1 | 6/2012 | Zimmermann et al. |

* cited by examiner

LED LIGHTING CIRCUIT

CROSS-REFERENCE TO PRIOR APPLICATIONS

This application is the U.S. National Phase application under 35 U.S.C. §371 of International Application No. PCT/EP2014/058035, filed on Apr. 21, 2014, which claims the benefit of European Patent Application No. 13166445.0, filed on May 3, 2013. These applications are hereby incorporated by reference herein.

FIELD OF THE INVENTION

The invention describes an LED lighting circuit, and a lighting arrangement for illuminating objects with light of a predefined color point.

BACKGROUND OF THE INVENTION

For various lighting applications, different colored light-emitting diodes (LEDs) can be combined to provide light with a certain desired color point. LEDs can emit green, blue, yellow or red light in the visible portion of the light spectrum. It is possible to obtain a 'white' LED by using a phosphor to convert the light emitted by a blue LED into white light. Similarly, blue light from blue-emitting LEDs can be converted into red light using suitable phosphors. However, this less efficient compared to directly obtaining red light from red-emitting LEDs, since phosphor conversion is associated with Stokes shift losses. With suitable combinations of 'white' and colored LEDs, light with certain efficacy can be achieved. For example, 'white' LEDs can be combined with red LEDs to obtain light with a reddish hue. Such a combination can be useful when it is desired to enhance the color rendering of red or reddish objects such as certain foodstuffs, such as meat, fruit, red-colored vegetables, etc. since the color rendering of red objects using 'pure' white light is generally poor. The color point of a combined-color light source can be determined by the number of white and colored LEDs used, and/or by the manner in which they are driven. For example, in one approach, the contribution of a particular LED color can be increased or decreased by adjusting the nominal forward current for the LEDs of that color. Alternatively, additional LEDs can be activated in order to obtain a desired overall color.

In any diode, the P/N junction activation energy levels exhibit temperature dependency, which can be quantified as a relationship between junction temperature and the drop in diode forward voltage. This relationship will depend to a large extent on the material used for the diode. For this reason, different colored LEDs have different temperature characteristics, and the luminous or photon flux of an LED, and therefore the light output of the LED, is therefore temperature-dependent. In other words, the light output of an LED starts to drop above a certain temperature. Therefore, the color point of a light source using LEDs of different colors will shift away from the initial color point. For example, red LEDs in combination with LEDs of one or more different colors (such as white) will be shifted 'away' from the red as the temperature increases. This may be problematic, since the human eye is very sensitive to slight color changes, i.e. to slight variations in color point. In a lighting application in which the red component is important, for example for refrigerated display lighting or shelf lighting, such a shift in color point can be noticed and may have an adverse effect on the perceived quality of the lighting. The light output of LEDs that emit light within a certain color range, for example 'red' LEDs (wavelength about 660 nm) and 'far-red' LEDs (wavelength about 730 nm), can also differ significantly as the junction temperature rises. While imperceptible to a human observer, the relationship between red and far-red components of the light spectrum can have noticeable effects on plants that are illuminated by a lighting arrangement using a combination of such LEDs, since plant phytochromes require a balance between red and far-red light, and plant physiological processes such as blossom induction, stem stretching, germination etc. are largely controlled by the plant phytochromes.

To deal with the problem of color point 'drift' with rising temperature, combined-color LED lighting arrangements generally make use of some kind of sensor to detect the temperature of the LEDs and/or to sense the color of the light output by the LEDs. For example, a prior art lighting arrangement using a temperature sensor can determine when a certain junction temperature has been reached, and can drive the more temperature-sensitive red LEDs by increasing their LED current. Another prior art lighting arrangement uses an optical color sensor, for example a tri-color or bi-color photodiode array, to continually monitor the combined color output. To correct a color shift or color point drift, a color feedback control circuit can be used to drive LEDs of the 'weaker' color so that these contribute more to the overall light output. Again, this can be achieved by increasing the LED current of those LEDs or by activating more LEDs of that color. Another known approach is to include a voltage measurement means in the circuit to measure the drop in forward voltage over temperature-sensitive LEDs such as a string of red LEDs. The forward voltage drop value is then converted by a controller into an increase in current for those more temperature-sensitive LEDs.

However, such sensors or measurement circuitry are expensive and add to the overall cost of the lighting arrangement. If 'extra' LEDs are included to compensate for a possible color shift at higher temperatures, these also add to the cost of the lighting arrangement but are only used during a color adjustment at such high temperatures, and are otherwise unused.

US2011/0115406 describes a white light emitting device with a primary and secondary set of LEDs, in particular a set of red and a set of blue lights. The device includes a drive circuit to compensate for variation in the ratio of red to blue light in the emission product due to the operating temperature. The circuit does not compensate for the emission intensity. The driver applies temperature sensors and/or temperature dependent resistors.

Therefore, it is an object of the invention to provide a more economical combined-color LED lighting arrangement with a favorably constant color output.

SUMMARY OF THE INVENTION

The object of the invention is achieved by the lighting circuit of claim 1; by the lighting arrangement according to claim 12 for illuminating objects with light of a predefined color point; and by the method according to claim 15 of driving a lighting circuit.

According to the invention, the lighting circuit comprises one or more primary sets of light-emitting diodes of a first color and one or more secondary sets of light-emitting diodes of at least one second color, wherein a temperature-dependent reduction in light output of the primary set of light-emitting diodes is greater than a temperature-dependent reduction in light output of the secondary set of light-emitting diodes; and a flux ratio fixing arrangement realized to maintain an essentially constant ratio between the light output of the primary set of light-emitting diodes and the light output of the secondary set of light-emitting diodes during a temperature-dependent overall reduction in light output of the light-emitting diodes of the lighting circuit.

The term "light output" is to be understood to mean the luminous flux or photon flux of a set of light-emitting diodes, depending on the wavelength of the emitted light. For LEDs emitting in the visible spectrum, the term "light output" is to be interpreted as "luminous flux". Similarly, for LEDs emitting outside of the visible spectrum, for example in the far-red end of the spectrum, the term "light output" is to be interpreted as "photon flux".

The relationship between the temperature of a diode and the forward voltage across that diode is well-described, i.e. a certain change in temperature will result in a corresponding certain change in forward voltage. Some types of prior art combined-color lighting circuits use a diode as a temperature sensor for this reason. The 'flux ratio fixing arrangement' of the lighting circuit according to the invention uses this knowledge in a different way. Unlike the prior art corrective arrangements, it does not attempt to measure or quantify the drop in light output using measurement circuitry or sensors; neither does it attempt to maintain a constant overall or combined light output of the lighting circuit. Instead, a drop in light output is accepted, and the flux ratio fixing arrangement effectively directly applies the voltage drop over the primary set of LEDs to adjust the current through the primary set (or both sets) of LEDs, to 'close the gap' between the large decrease in light output of the primary set, and the less severe decrease in light output of the secondary set, thereby ensuring that the light output ratio remains essentially constant, even though the light output of the primary set of light-emitting diodes is more temperature-dependent than the light output of the secondary set of light-emitting diodes. In other words, if the light output of the secondary set of diodes should decrease as a result of a temperature-related drop in forward voltage, the flux ratio fixing arrangement performs an adjustment of the light output at least of the primary set of diodes is upwardly corrected so that the light output ratio of both primary and secondary sets remains essentially constant, regardless of temperature. In this way, the lighting circuit presents a simple solution to the problem of how to ensure that the perceived color of a combined-color lighting circuit remains constant, while not making any effort to achieve a constant light output of the overall lighting circuit. The flux ratio fixing arrangement is realized as an integral part of the lighting circuit according to the invention. The invention makes use of another characteristic of light perception, namely that the eye cannot distinguish very well between slightly differing light levels. For example, a decrease in overall light output or light output of the lighting circuit is not perceptible by the human eye. However, a slight change in color would be noticeable. Instead of trying to compensate a reduction in the light output of one color by increasing the number of active LEDs of that color or by extending their LED current to increase their light output, the lighting circuit according to the invention takes an entirely different approach and regulates the light output of the primary set to effectively 'match' or 'follow' the reduction in light output of the secondary set. A perceptible alteration in color is therefore avoided. Another advantage of the lighting circuit according to the invention is that the constant color-point can be achieved in a straightforward and economical manner, since the flux ratio fixing arrangement is realized as an integral part of the lighting circuit, and can be realized using relatively few circuit components, as will be explained below. This means that there is no need for any additional measuring circuitry such as a temperature sensor, optical sensor, voltmeter, etc., and there is no need for a controller to convert measurements obtained from such sensors into an adjusted LED current signal.

According to the invention, the lighting arrangement for illuminating objects with light of a predefined color point comprises at least one such lighting circuit, wherein the light-emitting diode sets of a lighting circuit are chosen to emit, in combination, light of the predefined color point at an initial temperature and wherein the flux ratio fixing arrangement of the lighting circuit is realized to maintain that color point at a temperature higher that the initial temperature.

An advantage of the lighting arrangement according to the invention is that the color of the light with which the objects are illuminated will remain the same even if the temperature increases beyond a level at which the light output of the different colored LEDs would normally differ significantly. In this way, objects can be illuminated with light of a constant color quality, even if the overall light output of the lighting circuit decreases, and even if the light output of the different LED sets are temperature-dependent to different extents.

According to the invention, the method of driving a lighting circuit—comprising a primary set of light-emitting diodes of a first color and a secondary set of light-emitting diodes of a further color; wherein a temperature-dependent reduction in light output of the primary set of light-emitting diodes is greater than a temperature-dependent reduction in light output of the secondary set of light-emitting diodes—comprises the step of increasing the light output of the primary set such that an essentially constant ratio between the light output of the primary set and the light output of the secondary set is maintained during a temperature-dependent overall reduction in light output of the light-emitting diodes of the lighting circuit.

An advantage of the method according to the invention is that there is no need to actually measure any quantity such as temperature, voltage, color etc. Instead, the light output 'correction' basically involves an adjustment of at least the light output of the primary LED set to follow an inherent drop in light output of the secondary LED set. Again, the method according to the invention does not try to maintain a certain overall level of light output or light output at increasing temperatures, instead it simply maintains a certain ratio in light output, regardless of the temperature, and accepts a possible overall reduction in light output of the combined color lighting circuit.

The dependent claims and the following description disclose particularly advantageous embodiments and features of the invention. Features of the embodiments may be combined as appropriate. Features described in the context of one claim category can apply equally to another claim category.

As mentioned above, the light output or light output of an LED is temperature dependent. The temperature dependency is related to the color of the LED. The junction temperature of an LED may be inferred from its pad temperature, which can be measured at circuit board level. For example, at pad temperatures of only about 50° C., an aluminum-indium-gallium-phosphor (AlInGaP) red LED may only deliver about 80% of its rated or nominal light output. The reduction in light output of a phosphor based 'white' LED will not be as severe at such temperatures. In other words, the drop in light output is different for the different-colored LEDs. At higher pad temperatures, the difference in light output is even more pronounced (this will be shown graphically and explained below with the aid of FIG. 1). For example, at 100° C., the light output of the red LED may be only about 50%. Typically, the temperature dependency in light output for such a red LED can be 0.6% decrease per degree Kelvin. For a 'white' LED, the temperature dependency of the light output may be only about 0.12% per degree Kelvin. Therefore, the temperature-dependent difference in luminous flux comprises about 0.5% per degree Kelvin (0.5% $K^{-1}$). In a combined-color lighting arrangement using such LEDs, a clearly perceptible color shift, away from red and towards the white, will occur as the temperature increases. The pad temperature of a diode can be measured in experiments, and is generally directly related to the junction temperature of the diode. The invention makes use of the fact that an increase injunction temperature is associated with a drop in forward voltage over the junction, in a well-established and known relationship. Therefore, in a particularly preferred embodiment of the invention, the flux ratio fixing arrangement is realized to increase the current through the light-emitting diodes of the primary set by essentially the same proportion by which the light output of the primary set decreases relative to the light output of the secondary set. For example, using the values mentioned above, a 0.5% $K^{-1}$ difference in luminous flux is corrected by a 0.5% $K^{-1}$ increase in diode current through the LEDs of the primary set. In other words, the flux ratio fixing arrangement of the lighting circuit acts to increase the current through the LEDs of the primary set by an amount corresponding to the difference between the luminous flux of the primary set and the luminous flux of the secondary sets.

In a particularly preferred embodiment of the invention, the flux ratio fixing arrangement comprises a compensation resistor connected to the primary set of light-emitting diodes, wherein the resistance of the compensation resistor is chosen on the basis of the difference between the temperature-dependent reduction in light output of the primary set of light-emitting diodes and the temperature-dependent reduction in light output of the secondary set of light-emitting diodes. Using the known relationship U=IR (where U is voltage, I is current, and R is resistance), the required value of resistance can be determined on the basis of a known total drop in forward voltage per degree Kelvin over the LEDs of the primary set and the desired increase in diode current through the LEDs of the primary set.

The flux ratio fixing arrangement is not limited to increasing the current through the primary set of LEDs. Instead, the drop in forward voltage over the primary set can also be used to influence the secondary set. In a preferred embodiment of the invention, therefore, the flux ratio fixing arrangement is realized also to decrease the current through the light-emitting diodes of the secondary set on the basis of a drop in forward voltage over the light-emitting diodes of the primary set. In such a realization, the diode current through the primary set is increased while the diode current through the secondary set is decreased. Here, the effect is to perform an 'upward' correction of the light output of the primary set, and a 'downward' correction of the light output of the secondary set.

Generally, a string or set of diodes in a lighting circuit is driven by an appropriate driver circuit, represented in circuit diagrams as a current source delivering an electric current that can be proportional to the voltage across it (linear current source) or independent of the voltage across it (constant current source). In a preferred embodiment of the invention, the light circuit comprises a linear current source for a light-emitting diode sets. For example, in a preferred embodiment of the invention, the lighting circuit comprises a temperature-dependent linear current source for a light-emitting diode set. An example of such a temperature-dependent linear current source can include a bipolar junction transistor (BJT), since the current through the transistor is influenced by the junction temperature in essentially the same manner as for a diode.

In a further preferred embodiment of the invention, the linear current source of a light-emitting diode set can comprise a temperature-independent current source. For example, the linear current source can comprise an essentially constant voltage reference. Any of the above current sources can be realized using relatively cheap off-the-shelf components.

Regardless of the type of current source used, the compensation resistor of the flux-ratio fixing arrangement can be arranged in a number of ways, depending on the approach taken in "closing the gap" between light output of the primary and secondary LED sets. In one preferred embodiment of the invention, the compensation resistor is connected in parallel to a current source of the primary set of light-emitting diodes. In such an arrangement, only the diode current through the primary set will be influenced as the junction temperature rises, i.e. increased, to increase the light output of the primary LEDs (e.g. red LEDs) so that the primary set LEDs deliver a level of light output to match the light output of the secondary (e.g. white) LEDs at higher junction temperatures. Alternatively, the compensation resistor itself can also act as a current source.

In a further preferred embodiment of the invention, the compensation resistor is connected between the primary set and the secondary set. In this way, the drop in forward voltage over the LEDs of the primary set is also used to influence the light output of the LEDs of the secondary set. In a preferred embodiment of the invention, the compensation resistor is connected between the primary set of light-emitting diodes and a current sense resistor of a current source of the secondary set of light-emitting diodes. In this way, the drop in forward voltage over the LEDs of the primary set is used to increase the current through the primary (e.g. red or amber LEDs), and is also used to decrease the current through the secondary (e.g. white) LEDs. The net effect is to increase the light output of the more temperature-dependent LEDs, and at the same time to decrease the light output of the less temperature-dependent LEDs. The value of a compensation resistor used in such an embodiment may be chosen under consideration of an alteration in current through the secondary LEDs as a result of a temperature dependency of the current source of the secondary LED set.

The above embodiments described linear drivers for the LEDs. In a linear driver, the difference between the forward voltage and supply voltage is dissipated, for example by a resistor, and is effectively wasted. As an alternative to the linear current sources mentioned above, the lighting circuit according to the invention can make use of switched-mode current sources instead, since these are generally more efficient. In a switched-mode driver circuit, 'excess' energy is not dissipated, but instead stored and released using components such as capacitors and inductors. Such components only act as impedance when an alternating voltage or current is applied. A switched-mode driver therefore preferably generates (high frequency) alternating voltages and currents by using an arrangement of transistors in a switching device. In such an embodiment, instead of the LEDs being constantly driven, the LEDs can be rapidly switched using a high-frequency signal so that they only appear to be continuously 'on', while they are in fact 'off' for a significant fraction of the overall time. In such an embodiment, the magnitude of the current through the primary set, and optionally also the secondary set, can be regulated by a compensation resistor as described above, while a suitable integrated circuit component can be used to apply a high-frequency pulse-width modulated (PWM) switching signal to a suitable transistor such as a field-effect transistor (FET) to switch the diode current.

Each set of LEDs preferably comprises only LEDs of a single color and type, so that any diode current adjustment can be performed in a reliable and precise manner. However, the lighting circuit can comprise one or more primary LED sets and/or one or more secondary LED sets. For example, a lighting circuit can comprise a primary set with green LEDs in addition to a primary set with red LEDs, as well as a secondary set with 'white' LEDs and another secondary set with blue LEDs. The flux ratio fixing arrangement can be realized to only correct the light output of one or both of the primary sets. Equally, it may also be realized to correct the light output of one or both of the secondary sets.

One embodiment of the lighting arrangement according to the invention may be used to illuminate foodstuffs such as meat, fruit and vegetables. A 'reddish' light is optimal for illuminating such foodstuffs, for example with a color point or color temperature of about 2700 K and 3500 K ('warm' white) K. Such a lighting arrangement therefore preferably comprises a primary set of LEDs of a red color, and at least one secondary set of 'white' LEDs, for example phosphor-coated blue LEDs. In such an embodiment, the LEDs of the primary set preferably emit light with a wavelength in a region about 660 nm; while the LEDs of the secondary set preferably emit essentially white light. The color temperature of the lighting circuit is maintained even if the pad temperature increases to levels of 50° C., 70° C., or beyond. The lighting arrangement according to the invention therefore makes it possible to maintain a desired color point or color temperature without having to use expensive and complex temperate sensors or color sensors, and without having to actually measure the voltage drop over any of the diodes during their operation. The light output correction is entirely automatic and immediate, maintaining an essentially constant desired color temperature and allowing an overall drop in light output.

In an alternative embodiment, a 'warm white' may be obtained by a lighting circuit according to the invention in which the primary set of LEDs comprises 'greenish' LEDs that do not comprise red phosphors but only green or yellow phosphors. The secondary LED set consist of direct red or orange emitters, i.e. LEDs that emit red or orange light directly. The primary LED set has a somewhat 'greenish' hue, and the secondary LED set will appear red, so that light emitted by this combination will appear white, with a color temperature ranging from 2700 to 3500 K, and the color point of the light emitted by this lighting circuit can lie on the black body line.

Another embodiment of the lighting arrangement according to the invention may be used to provide horticultural lighting for the indoor illumination of plants. Here, the light-emitting diodes of the primary set of a lighting circuit are preferably chosen to emit light with a wavelength in a region about 660 nm ('red' light), while the light-emitting diodes of a secondary set are preferably chosen to emit light with a wavelength in a region about 760 nm ('far-red' light).

The flux ratio fixing arrangement is preferably realized to ensure that the ratio of red to far-red light remains one-to-one, so that the plants are exposed to light that correctly encourages growth. Known lighting arrangements without such red/far-red correction may result in stunted or weak plants, since an unbalanced relationship between red and far-red light has a detrimental effect on plant growth.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE EMBODIMENTS

Figure 1:
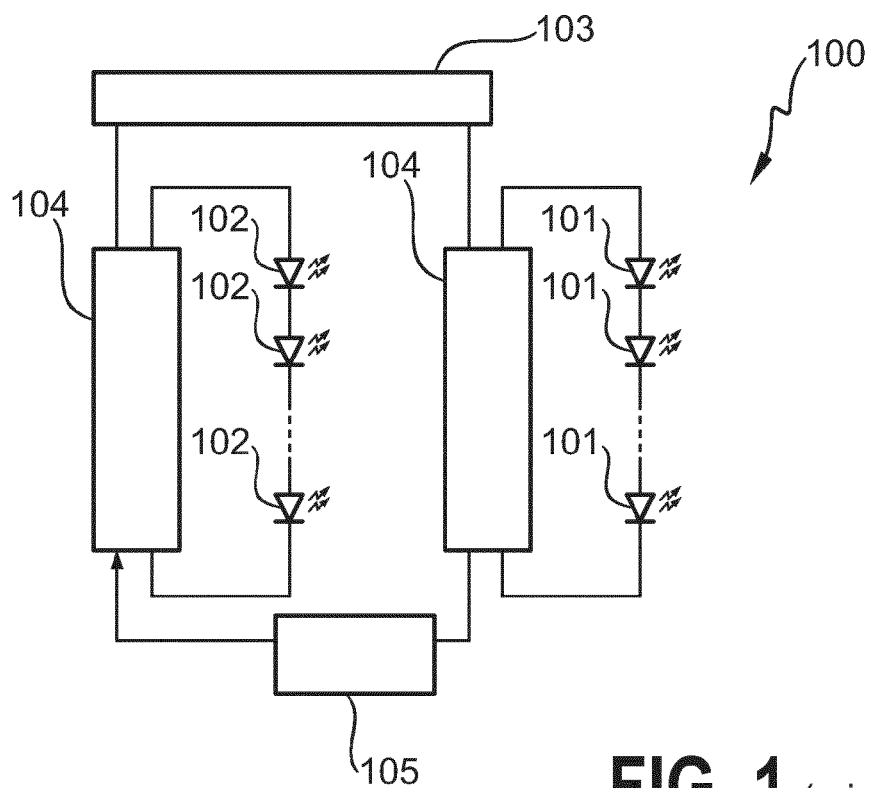
FIG. 1 shows a simplified circuit diagram of a conventional combined-color LED lighting circuit.

FIG. 1 shows a simplified circuit diagram of a conventional combined-color LED lighting circuit 100. The circuit 100 comprises two strings of LEDs 101, 102. A first string comprises serially connected red LEDs 101, while a second string comprises white LEDs 103 in series. The conventional representation includes a voltage supply 103 for applying a potential difference across the LED strings, and a driver for driving each LED string. The number of LEDs in the lighting circuit 100 determines the overall color, and this can also be influenced by the manner in which the LEDs are driven. During operation of the lighting circuit, the junction temperature of the LEDs increases. This can lead to a color shift. This prior art lighting circuit can detect such a color shift by a sensing unit 105, which can comprise a suitable sensor. For example, a temperature sensor can detect an increase in temperature, and a control arrangement of the sensing unit 105 can determine a required corrective LED current on the basis of the detected temperature increase. A voltage sensor can measure a drop in the forward voltage over the red LEDs 101, and a control arrangement can determine a required corrective LED current on the basis of the voltage drop. A photodiode sensor can detect the actual color shift, and a control arrangement can determine a required corrective LED current on the basis of the color shift. The sensing unit 105 can respond to the measured quantity (temperature, voltage, light output) by adjusting the number of white and/or red LEDs that are to be driven, and/or by adjusting the duty cycles of the active LEDs. The requirement to include such sensing circuitry means that the cost and complexity of such a conventional combined-color lighting circuit is relatively high. Furthermore, its ability to compensate for an extreme shift in color may be limited. For example, it may not be possible to correct a pronounced color shift at higher temperatures if the lighting circuit does not have enough red LEDs, since the maximum amount of red light that can be emitted by a single LED is determined by its chip size and thermal construction.

Figure 2:
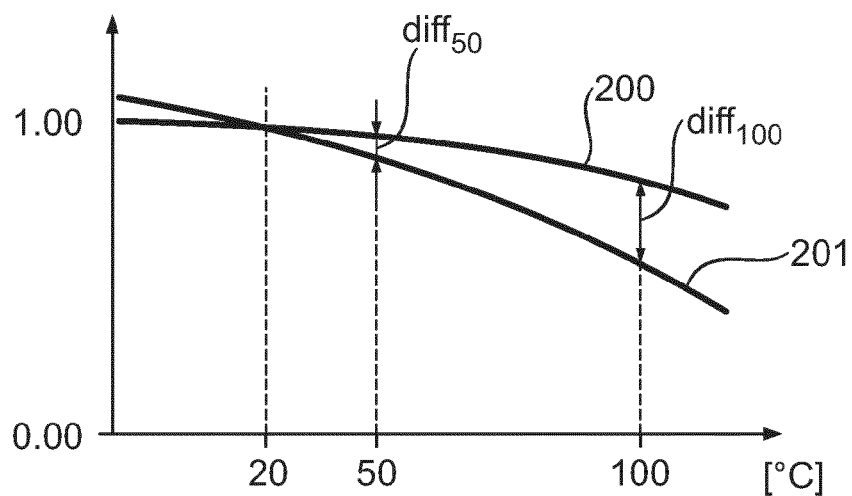
FIG. 2 shows a graph of the relative luminous flux of a white LED and a red LED.

FIG. 2 shows a representative graph of the relative luminous flux of a white LED and a red LED, plotted against pad temperature [° C.], illustrating how a color shift may arise in a combined-color lighting arrangement. A first curve 200 shows a fairly steady light output for a white LED. The second curve 201 shows a clearly decreasing light output for a red LED. Even at pad temperatures of only about 50° C., the red LED is already delivering only about 80% of luminous flux, as indicated by the first vertical bar $\text{diff}_{50}$. The white LED continues to deliver almost 100%. At higher pad temperatures, the difference is even more pronounced, as indicated by the second vertical bar $\text{diff}_{100}$. At 100° C., for example, the luminous flux of the red LED is almost halved. The temperature dependency of the luminous flux for a typical red LED, for example an aluminum-indium-gallium-phosphor red LED, can be 0.6% decrease per degree Celsius or Kelvin. For a white LED, the temperature dependency of the luminous flux may be only about 0.12% per degree Kelvin. The difference between the temperature dependencies therefore comprises about 0.5% per degree Kelvin. In a combined-color lighting arrangement using such LEDs, a clearly perceptible color shift away from red will occur as the temperature increases, since the red LEDs deliver progressively less light.

Figure 3:
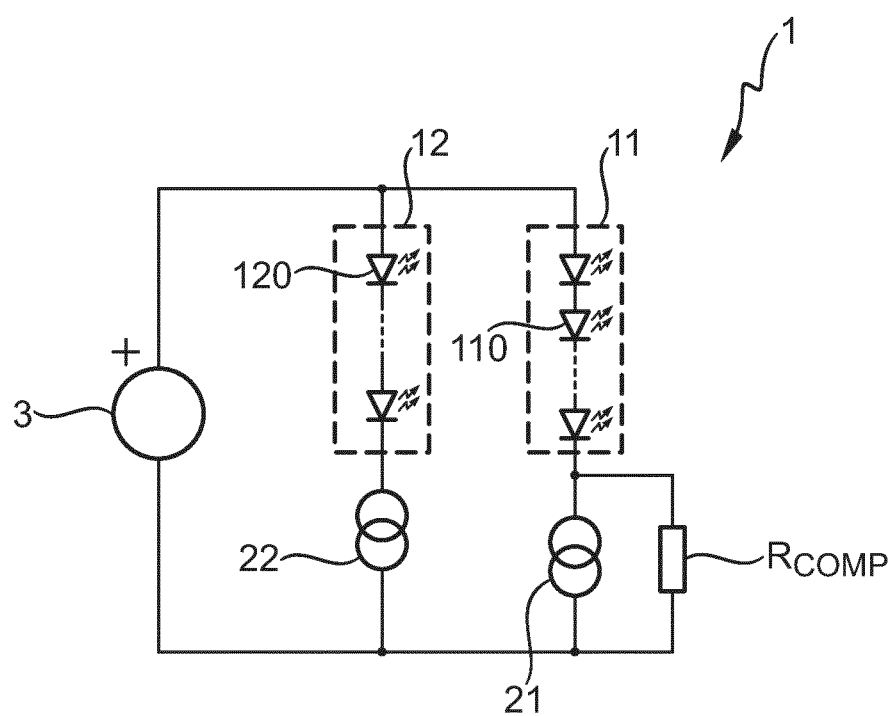
FIG. 3 shows a simplified circuit diagram of a first embodiment of a lighting circuit according to the invention.

FIG. 3 shows a simplified circuit diagram of a lighting circuit 1 according to a first embodiment of the invention. The lighting circuit 1 comprises a primary set 11 of red LEDs 110 and a secondary set 12 of white LEDs 120. Voltage is supplied by a DC voltage supply 3. A current source 21, 22 is arranged in series with each LED set 11, 12. The combined light output of this circuit will have the desired reddish color point at 20° C. The lighting circuit 1 according to the invention can maintain this color point, even at higher temperatures, as will be explained in the following.

It may be assumed that the temperature characteristics of the LEDs 110, 120 are as mentioned in FIG. 1 above, i.e. the white and red LEDs exhibit a difference in luminous flux of about 0.5%) per degree Kelvin. In other words, as the temperature increases, the light output of the red and white LEDs decreases, while the light output of the red LEDs 110 decreases by a greater extent than the decrease in light output shown by the white LEDs 120 (in the following, for the purposes of explaining the invention, this order of magnitude may be assumed, and it should be understood that actual values depend on the composition of the semiconductor devices and may therefore differ). The temperature-dependent color correction is achieved by a compensation resistor $R_{COMP}$, which serves to increase the current through the red LEDs 110 when the forward voltage over those LEDs 110 drops at higher temperatures. For example, the circuit may comprise ten red LEDs 110. The drop in forward voltage over the red LEDs 110 is assumed to be 2.0 mV per degree Kelvin per junction. The ten red LEDs 110 therefore have a combined drop in forward voltage of 20.0 mV per degree Kelvin. The nominal current $I_{red}$ through the red LEDs 110 may be assumed to be 20.0 mA in this example. Therefore, to compensate for the 0.5% difference per degree Kelvin in luminous flux, the current through the red LEDs 110 should increase by 0.5% for every degree Kelvin increase of temperature. This is achieved by the compensation resistor $R_{COMP}$. The value of this resistor is chosen according to the number of red LEDs 110 in series, and can be calculated using the formula $$R_{COMP} = \frac{n \cdot V_f}{K_{diff} \cdot I_{red}} \quad (1)$$

where $R_{COMP}$ is the value of the resistor in Ohms, n is the number of red LEDs 110 in series, $V_f$ is the drop in forward voltage over a red LED 110, $K_{diff}$ is the difference in luminous flux between the red and white LEDs, expressed as a percentage; and $I_{red}$ is the nominal current through the red LEDs 110.

For example, for ten such red LEDs 110 in series, the total drop in forward voltage is 20 mV per degree Kelvin, and the desired increase in current per degree Kelvin is 0.5%, and 0.5% of 20 mA is 0.1 mA. Putting these values into equation (1), the formula yields $$R_{COMP} = \frac{20 \text{ mV}}{0.1 \text{ mA}} = 200 \, \Omega \quad (2)$$

Therefore, the compensation resistor $R_{COMP}$ should have a value of 200Ω to achieve a temperature correction of 0.5% per degree Kelvin between the highly temperature-dependent red LEDs 110 and the less temperature-dependent white LEDs 120. Using only nine red LEDs instead of ten, with a 200Ω resistor, the luminous flux correction would comprise 0.46% per degree Kelvin. Here, a 180Ω resistor would be required to achieve the desired luminous flux correction of 0.5% per degree Kelvin. In this example, only the current through the red LEDs is compensated.

Figure 4:
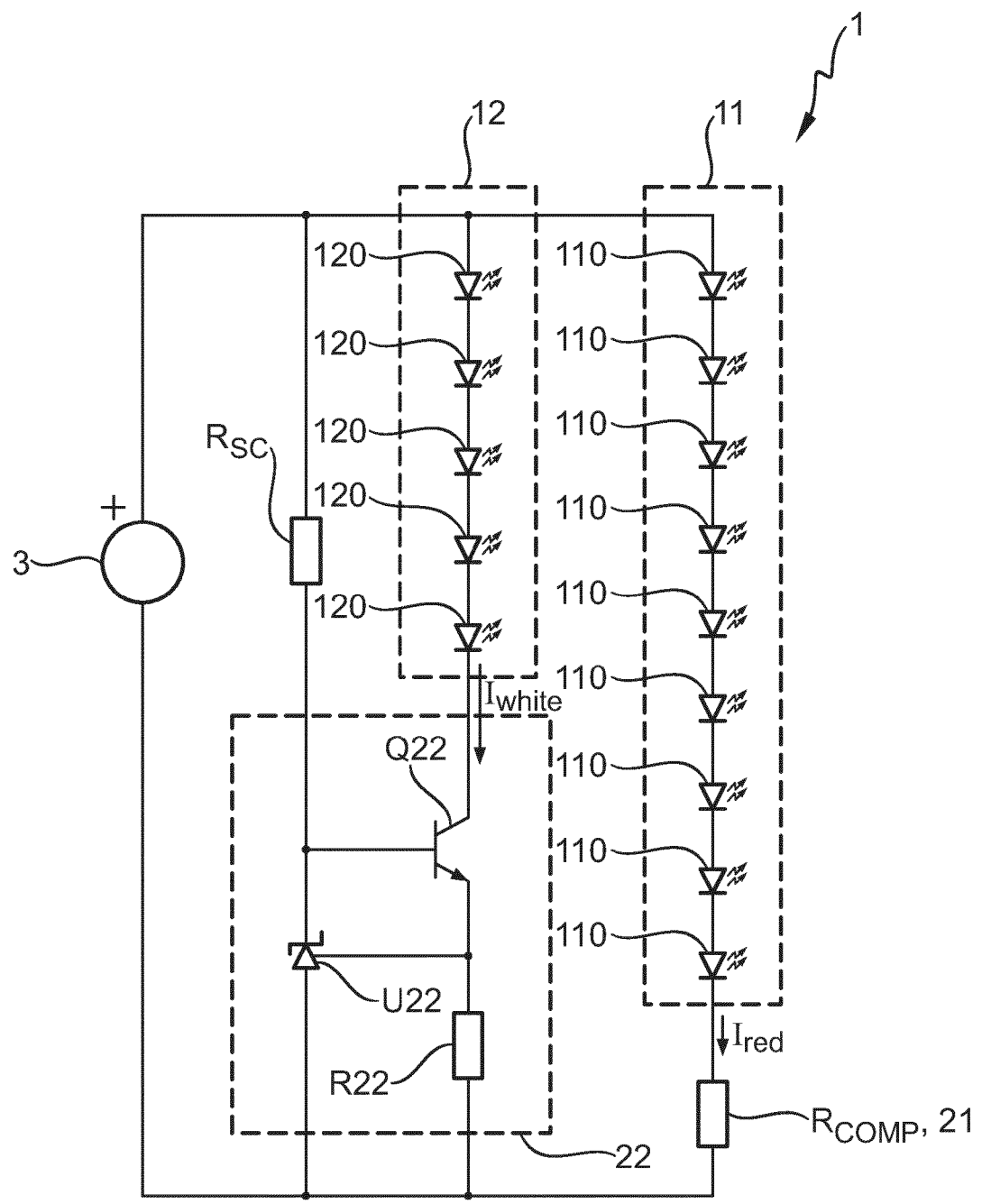
FIG. 4 shows a circuit diagram of the lighting circuit of FIG. 3.

FIG. 4 shows one embodiment of the circuit diagram of the lighting circuit 1 of FIG. 3. Here, the compensation resistor $R_{COMP}$ is also acting as the current source 21 for the set of red LEDs 110. The current source 22 for the white LEDs 120 comprises a transistor Q22, a current sense resistor R22, and a temperature-independent voltage source U22. A supply current resistor $R_{SC}$ is connected between the current source 22 and the LEDs 120 to provide the supply current for the voltage source. The current $I_{white}$ through the white LEDs 120 will decrease at higher temperatures. At the same time, the compensation resistor $R_{COMP}$ acts to increase the current $I_{red}$ through the red LEDs 110 so that the white-to-red ratio of luminous flux remains essentially constant. Therefore, the overall light output of the lighting circuit 1 drops as the temperature increases, but the color point or color temperature of the light emitted by the circuit 1 remains essentially constant. A human observer will therefore not perceive any color shift away from the red, and the drop in light output will also not be noticeable to him.

Figure 5:
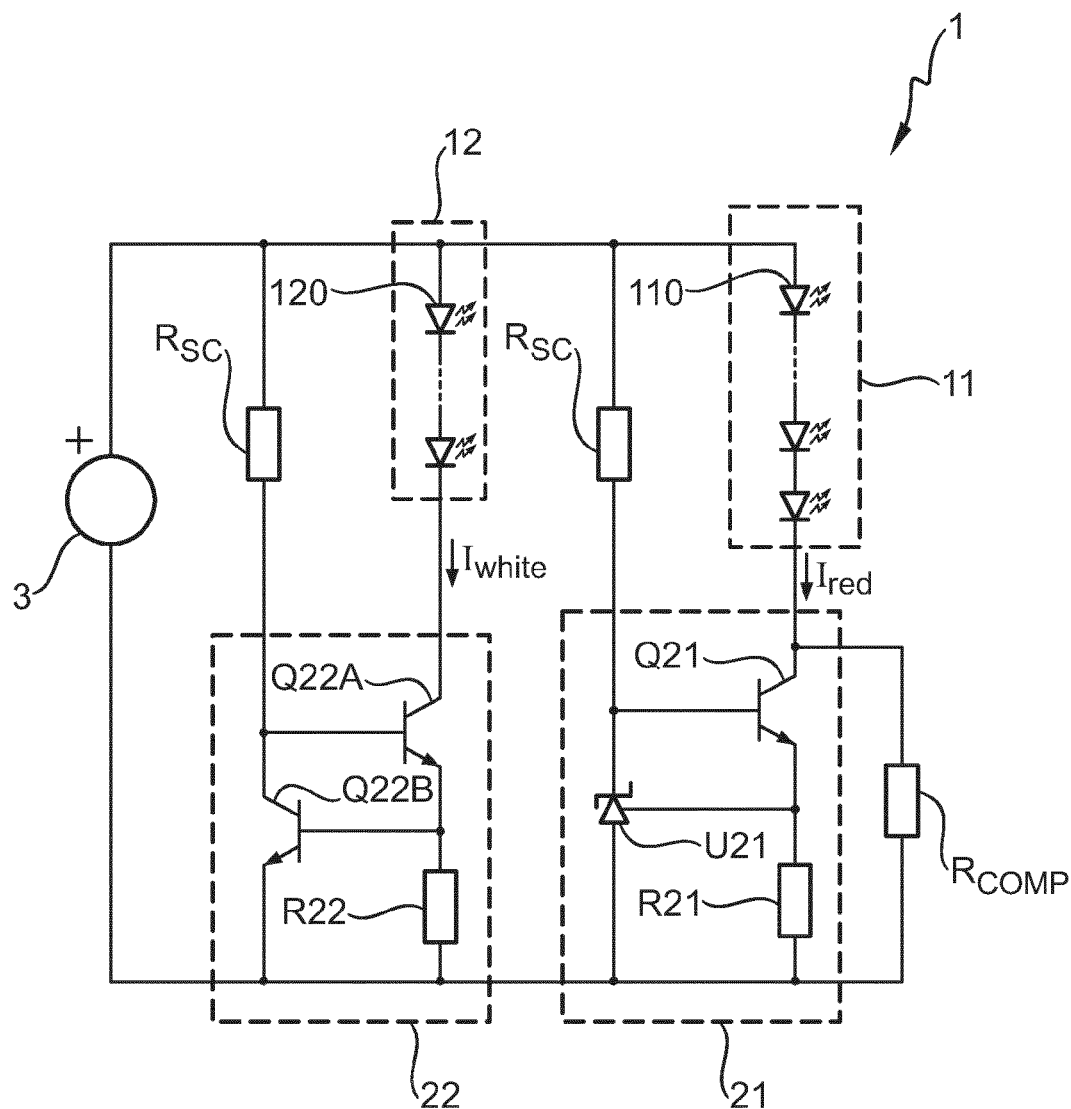
FIG. 5 shows a circuit diagram of a second embodiment of a lighting circuit according to the invention.

FIG. 5 shows a circuit diagram of a lighting circuit 1 according to a second embodiment of the invention. Here, the white LEDs 120 are driven using a temperature-dependent current source 22, with two transistors Q22A, Q22B arranged in an active feedback loop. In principle, this operates in the same way as the feedback loop using a reference voltage described above. Using one transistor Q22B (instead of the integrated circuit U22 described in FIG. 4, which consists of several transistors for temperature compensation), a cheaper realization is possible, which also gives more driver headroom and less voltage drop across the current sense resistor R22. Usually, such an approach would be regarded as less than satisfactory, since this feedback loop with the bipolar junction transistor Q22 is clearly temperature dependent. However, in the lighting circuit according to the invention, this temperature dependency is used to advantage, since the white LED current $I_{white}$ and the light output of the white LEDs will decrease when the junction temperature of the transistor Q22 increases. The transistor Q22 therefore automatically provides a partial compensation for the decrease in luminous flux of the red LEDs. The decrease in overall light output of this lighting circuit will therefore be more pronounced compared to the lighting circuit of FIG. 4, but the circuit is cheaper to manufacture. For example, the current $I_{white}$ through the white LEDs 120 may decrease by 0.3% per degree K. A compensation of only 0.2% is therefore required for the red LEDs 110. For a red LED current $I_{red}$ of 20 mA, this means that a current increase of only 0.04 mA will ensure that the color ratio of the lighting circuit 1 remains constant. For nine red LEDs 110 in series, this correction can be achieved by using a 450Ω compensation resistor $R_{COMP}$ in parallel with a temperature-independent current source 21, as shown, comprising a transistor Q21, a temperature-independent voltage source U21, and a current sense resistor R21 with a value of 125Ω.

Figure 6:
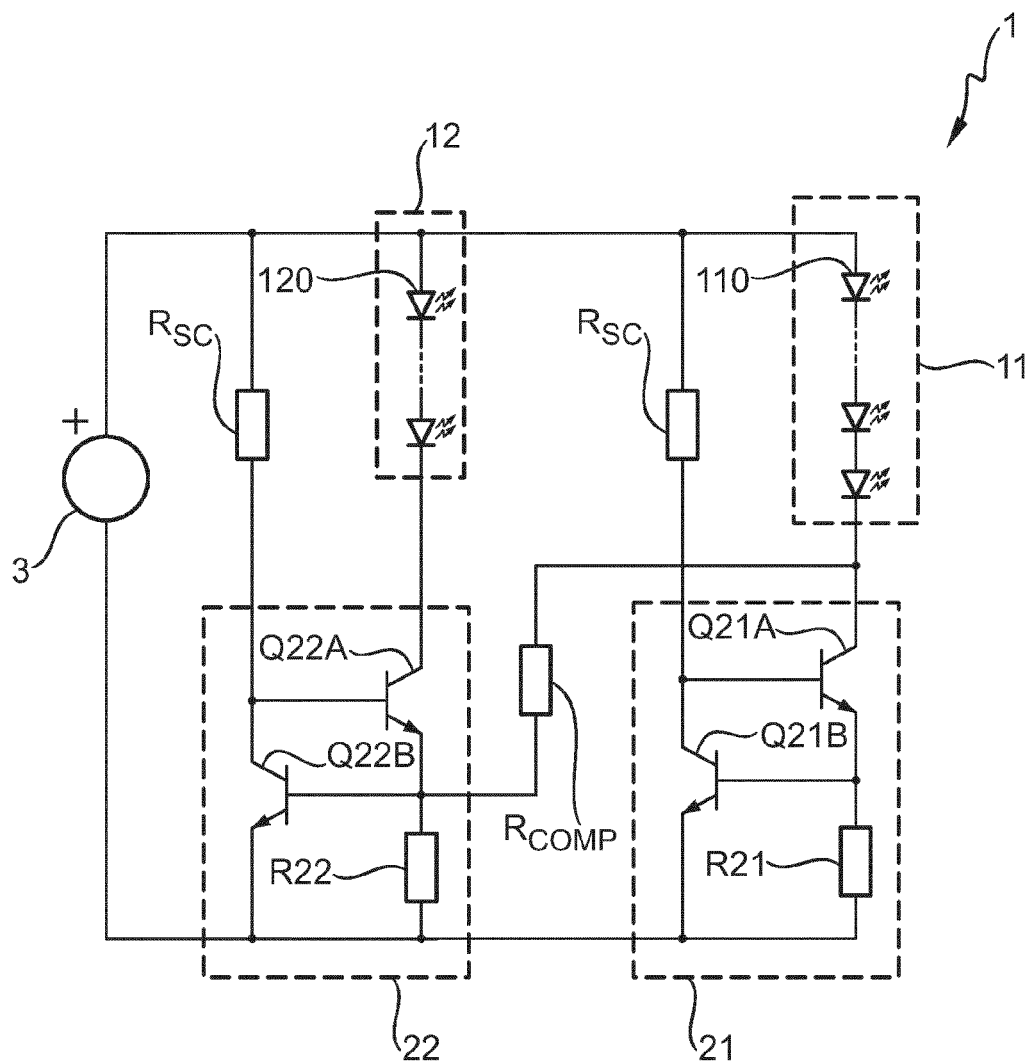
FIG. 6 shows a circuit diagram of a third embodiment of a lighting circuit according to the invention.

FIG. 6 shows a circuit diagram of a lighting circuit 1 according to a third embodiment of the invention. Here, both sets 11, 12 of LEDs 110, 120 are driven using temperature-dependent current sources 21, 22 of type described above. However, in this embodiment, the compensation resistor $R_{COMP}$ is connected between the primary set 11 of red LEDs 110 and the current-sense resistor R22 of the white LED current supply 22. In this case, the compensation resistor $R_{COMP}$ not only increases the current $I_{red}$ through the red LEDs 110, it also decreases the current $I_{white}$ through the white LEDs 120. The "compensation current" $I_{COMP}$ need only be half the value computed in the embodiment of FIG. 5 above, and the amount by which the white LED current $I_{white}$ decreases is the same as the amount by which the red LED current $I_{red}$ increases. Instead of using temperature-dependent current sources 21, 22 as shown here, temperature-independent components as described above (component U21 in FIG. 5; component U22 in FIG. 4) could be used in place of transistors Q21B and Q22B.

To dim an LED lighting circuit, the voltage across the LEDs is reduced. At low light levels, the junction temperatures of the LEDs in a lighting circuit will be lower than at nominal or high light levels. Owing to the different temperature dependencies of different-colored LEDs, the lower junction temperatures can lead to an unwanted color point shift when a combined-color LED lighting circuit is dimmed.

Figure 7:
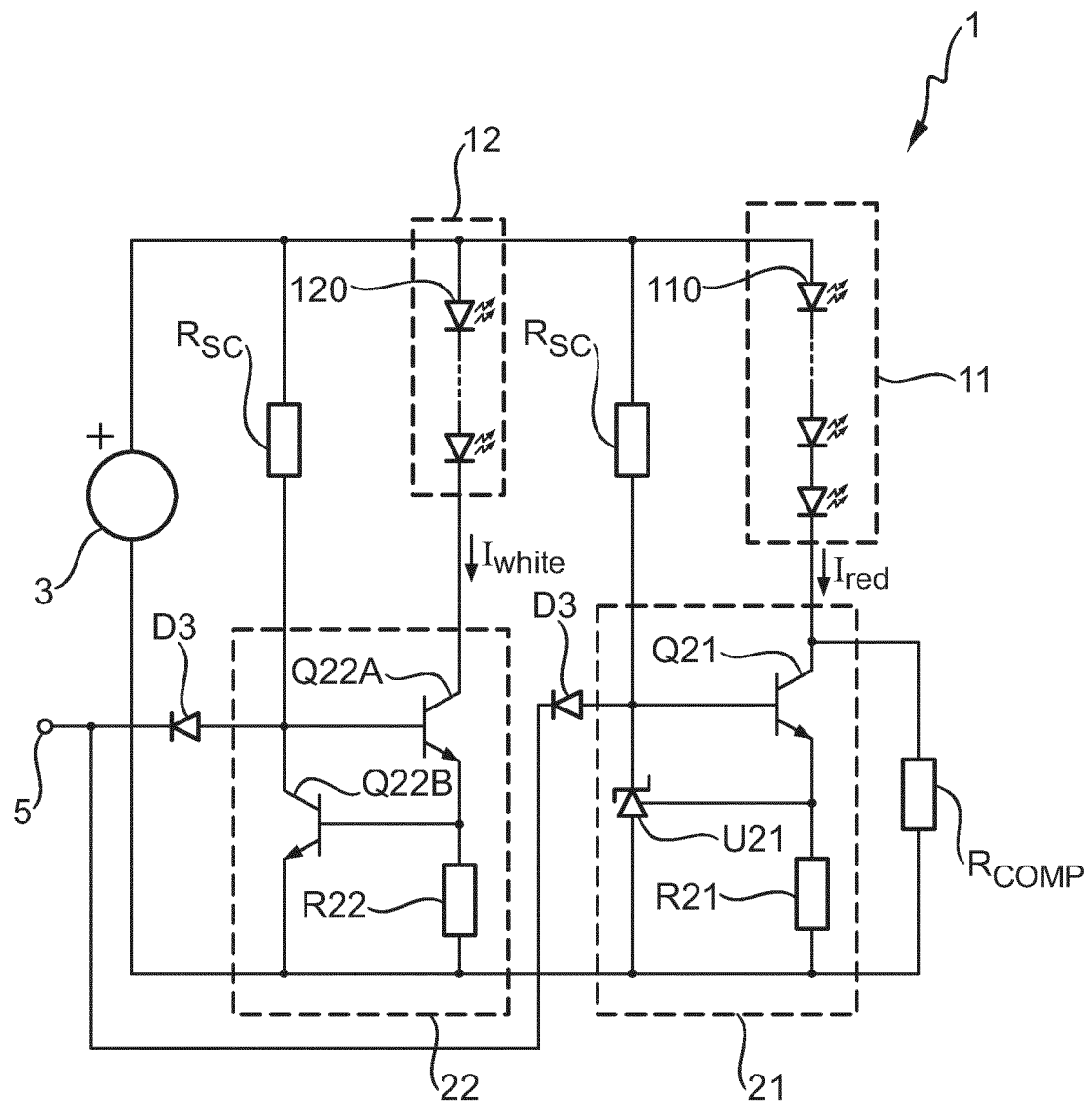
FIG. 7 shows a circuit diagram of a fourth embodiment of a lighting circuit according to the invention.

The feed-forward temperature compensation effected by the flux ratio fixing arrangement in the lighting circuit according to the invention will automatically compensate during dimming also. —FIG. 7 shows a further embodiment of the lighting circuit 1 according to the invention. Here, a dim input 5 is connected to the current sources 21, 22 to regulate the LED current $I_{red}$, $I_{white}$. As long as the dim voltage is low enough, some current will flow through the diodes D3 in proportion to the level of the dim voltage. Above a certain dim voltage, the current sources 21, 22 will drive the LED sets 11, 12 directly. In this embodiment, the temperature compensation provided by the flux ratio fixing arrangement $R_{COMP}$ (arranged here in parallel to the current source 21 of the red LEDs) prevents a color shift during dimming, so that the color point of the combined LED sets remains fixed at the desired level. In an alternative embodiment, power-line dimming could be applied, in which case the supply power is interrupted e.g. by a PWM operated switch or power FET.

Figure 8:
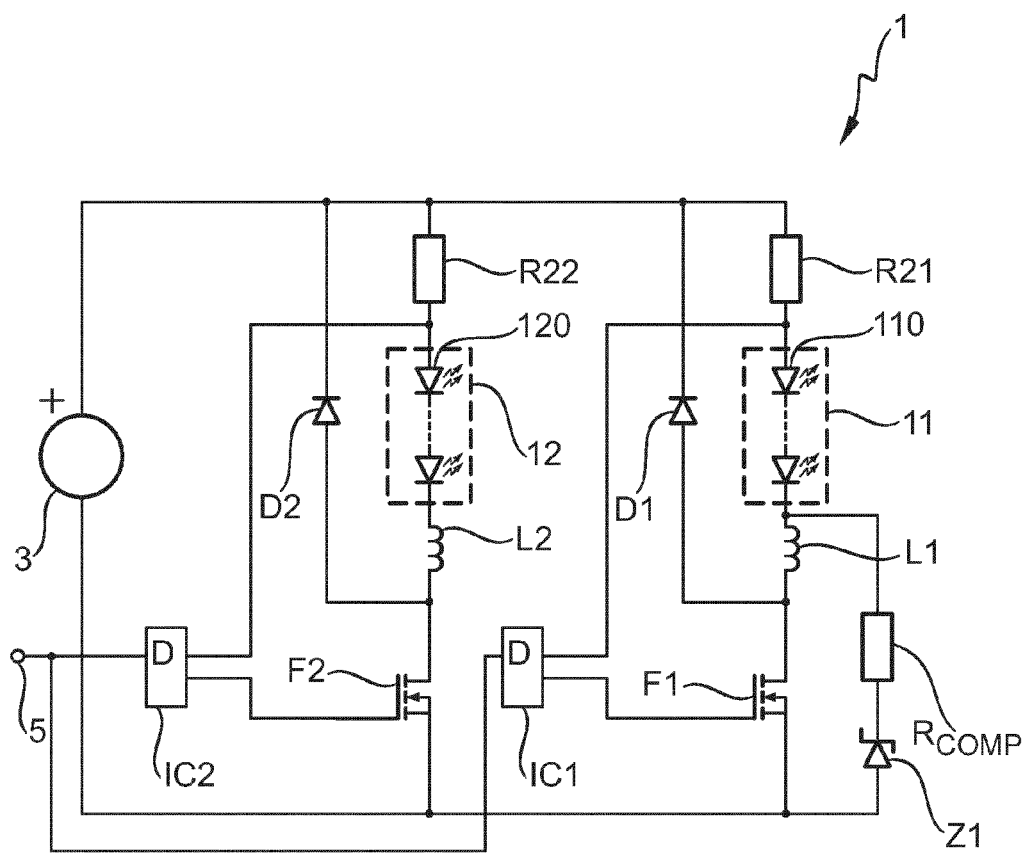
FIG. 8 shows a circuit diagram of a fifth embodiment of a lighting circuit according to the invention.

FIG. 8 shows a switched-mode version of a combined color lighting circuit 1 according to another embodiment of the invention. This version of the lighting circuit 1 uses a first integrated circuit component IC1 for controlling the current $I_{red}$ through the red LEDs 110, and a second integrated circuit component IC2 for controlling the current $I_{white}$ through the white LEDs 120. The switched-mode version of the lighting circuit 1 is more efficient than the circuits previously described in FIGS. 3-6. A field-effect transistor (FET) F1, F2 such as an N-channel enhancement-mode MOSFET is used to switch each LED string 11, 12 either 'on' or 'off', and the duration of the 'on' times is controlled in each case by the integrated circuit components IC1, IC2, each of which delivers a high-frequency pulse-width modulated (PWM) signal to the bulk of the corresponding FET F1, F2. Each integrated circuit IC1, IC2 can have an external input (labeled here as "D") for dimming, in addition to the other usual supply voltage and grounding pins. Dimming of the LEDs could in this case be performed by PWM. Here also, the temperature compensation provided by the flux ratio fixing arrangement $R_{COMP}$ prevents an unwanted color shift during dimming, so that the color point of the combined LED sets remains fixed at the desired level.

In this realization, each current sense resistor R21, R22 is arranged 'in front' of its diode string 11, 12. Smooth switching is achieved by using an inductor L1, L2 in series with each diode string 11, 12. Flyback diodes D1, D2 are used to ensure that the diode strings 11, 12 are not damaged by voltage spikes that arise when the MOSFET switches F1, F2 are 'opened'.

A zener diode Z1 is included to minimize losses in the compensation resistor $R_{COMP}$, and is chosen so that even at the lowest temperature, i.e. at the highest total forward voltage over a diode string 11, 12, a minimum compensation current $I_{COMP}$ flows through the compensation resistor $R_{COMP}$. In one example, the red diode string 11 comprises six red LEDs 110, and the current $I_{red}$ through the red LEDs 110 is 1.0 A.

To 'correct' the color difference of 0.5% per degree Kelvin at rising temperature, the current must be increased by 5.0 mA per degree K. Again, with a forward voltage drop of 2.0 mV per junction per degree Kelvin, the value of the compensation resistor $R_{COMP}$ can be determined using the relationship given in equation (1) above, which yields a value of 2.4Ω for the compensation resistor $R_{COMP}$.

Figure 9:
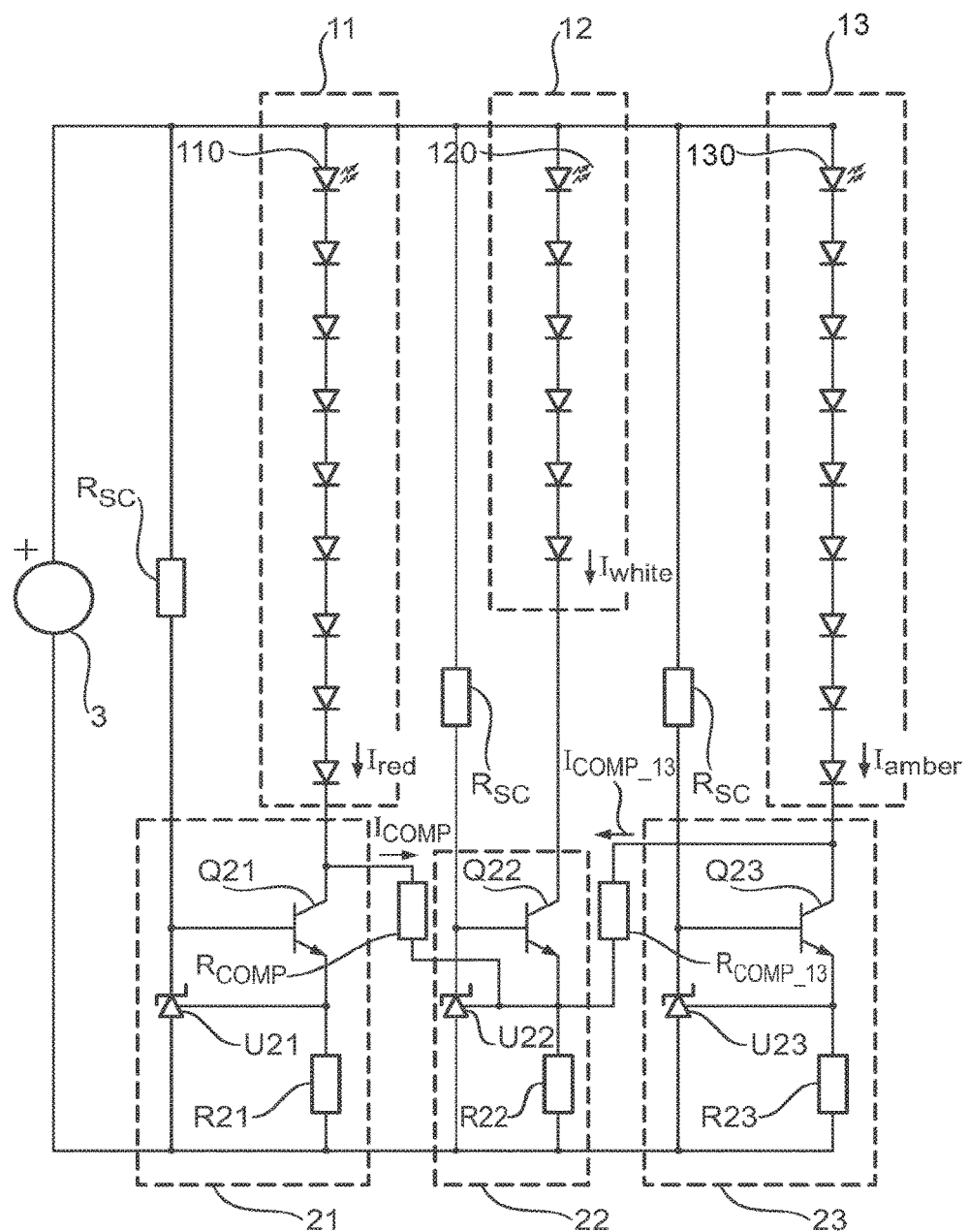
FIG. 9 shows a first embodiment of a lighting arrangement according to the invention.

An embodiment using three colors is shown in FIG. 9. Here, there are two 'primary sets' 11, 13 of LEDs that both perform an adjustment on the light output of the secondary set 12. A first primary set 11 comprises red LEDs 110, while the other primary set 13 comprises amber LEDs 130. Amber LEDs made with a high Aluminum doping are generally quite inefficient, being even more temperature-dependent than red LEDs, i.e. their luminous flux decreases even more severely as their junction temperature increases. Typically, the luminous flux of an amber LED decreases about three times as much as the luminous flux of a red LED. In this embodiment of the lighting circuit 1, the flux ratio fixing arrangement increases the current $I_{red}$, $I_{amber}$ through both primary LED sets 11, 13 and decreases the current $I_{white}$ through the white LED set 12. The compensation resistor $R_{COMP}$ of the red LED set 11 is connected to the current sense resistor R22 of the white LED current supply 22, and the compensation resistor $R_{COMP\_13}$ of the amber LED set 13 is also connected to that current sense resistor R22. Since the current $I_{amber}$ through the amber LEDs 130 needs to be increased about three times as much as the current $I_{red}$ through the red LEDs 110, the value of the compensation resistor $R_{COMP\_13}$ of the amber LED set 13 will be lower than the value of the compensation resistor $R_{COMP}$ of the red LED set 11. Its value can be calculated as described above, based on the total forward voltage drop per degree Kelvin, the nominal current through the amber LEDs, and the percentage difference in luminous flux between amber and white LEDs per degree Kelvin.

Figure 10:
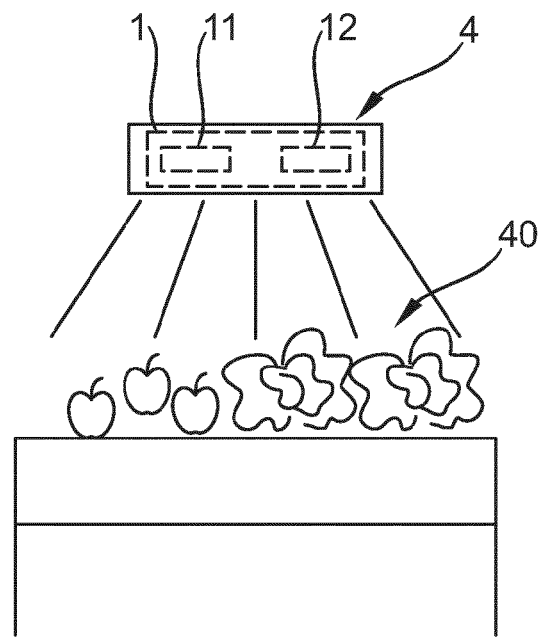
FIG. 10 shows a first embodiment of a lighting arrangement according to the invention.

FIG. 10 shows a first embodiment of a lighting arrangement 4 according to the invention, for the appetizing and attractive illumination of a display of produce 40 such as fresh fruit and vegetables. Here, the lighting arrangement 4 comprises one or more lighting circuits 1 as described above. Only one lighting circuit 1 is indicated here for simplicity. A primary set 11 of the lighting circuit 1 comprises red LEDs, while the secondary set 12 comprises 'white' LEDs, so that a color point of about 2700-3500 K is achieved at ambient temperatures. The flux ratio fixing arrangement of the lighting circuit ensures that the color point is maintained at essentially 2700-3500 K, so that the foodstuffs are optimally illuminated at all times.

Figure 11:
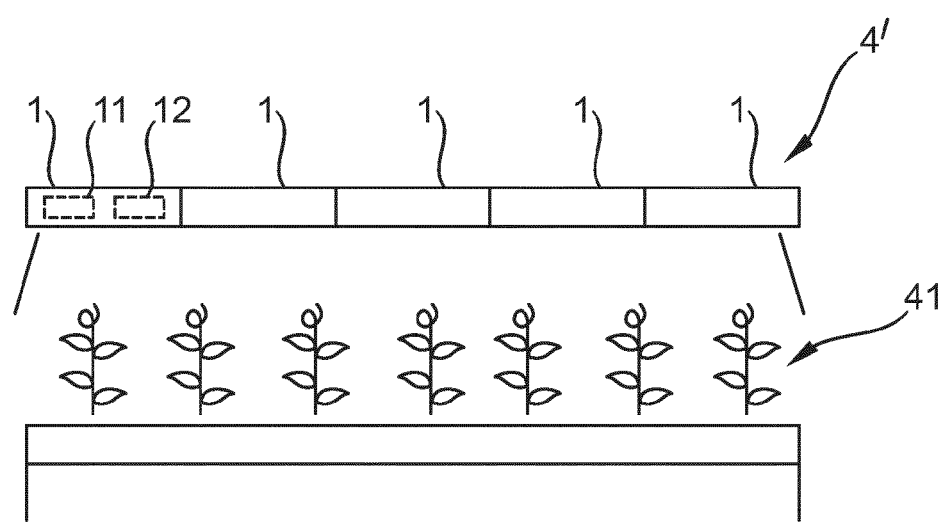
FIG. 11 shows a second embodiment of a lighting arrangement according to the invention.

FIG. 11 shows a second embodiment of a lighting arrangement 4 according to the invention, for an optimal illumination of plants 41 in an indoor horticultural application. Here, the lighting arrangement 4 comprises one or more lighting circuits 1 as described above. Only one lighting circuit 1 is described here for simplicity. A primary set 11 of the lighting circuit 1 comprises far-red LEDs, while the secondary set 12 comprises red LEDs. This arrangement is designed to provide a "light recipe" at ambient temperatures that is best suited to the absorption spectra of plant phytochromes that have sensitivity peaks in the red (around 660 nm) and far-red (around 730 nm) portions of the light spectrum, usually referred to as the "red/far-red ratio". The lighting arrangement can also comprise any number of additional secondary LED sets with blue and/or green and/or 'white' LEDs in suitable proportions, for example so that daylight can best be simulated. The flux ratio fixing arrangement of each such lighting circuit ensures that the ratio between the photon flux of the primary set(s) and secondary set(s) remains essentially constant, so that the overall light output satisfies the phytochrome red/far-red requirements, maintained even at increasing pad temperatures of the LEDs, so that the plants are optimally illuminated at all times, with a beneficial effect on their germination and/or growth. Red LEDs emitting at about 660 nm and blue or white LEDs emitting at 450 nm exhibit almost the same temperature dependency. Therefore, such LEDs can be arranged in further secondary LED sets of lighting circuits 1 of the lighting arrangement 4.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A lighting circuit comprising:
   a primary set of light-emitting diodes to output light of a first color;
   a secondary set of light-emitting diodes to output light of a second color; wherein a temperature-dependent reduction in the light output of the primary set of light-emitting diodes is greater than a temperature-dependent reduction in the light output of the secondary set of light-emitting diodes; and
   a flux ratio fixing arrangement to maintain a substantially constant ratio between the light output of the primary set of light-emitting diodes and the light output of the secondary set of light-emitting diodes during a temperature-dependent overall reduction in light output of the primary and secondary sets of light-emitting diodes of the lighting circuit,
   wherein the flux ratio fixing arrangement is configured to decrease a current through light-emitting diodes of the secondary set based on a drop in forward voltage over light-emitting diodes of the primary set of light-emitting diodes, or to increase a current through the light-emitting diodes of the primary set of light-emitting diodes based on a drop in forward voltage over the light emitting diodes of the secondary set of light-emitting diodes; and
   wherein the flux ratio fixing arrangement comprises:
      a first current source in series with the primary set of light-emitting diodes, for supplying a current to the primary set of light-emitting diodes;
      a second current source in series with the secondary set of light-emitting diodes, for supplying a current to the secondary set of light-emitting diodes;
      a DC constant voltage supply parallel across the series connection of the primary set of light-emitting diodes and the first current source, and parallel across the series connection of the secondary set of light-emitting diodes and the second current source; and
      a compensation resistor connected to the primary set of light-emitting diodes, wherein a resistance of the compensation resistor is constant and chosen based on the difference between the temperature-dependent reduction in light output of the primary set of light-emitting diodes and the temperature-dependent reduction in light output of the secondary set of light-emitting diodes.

2. The lighting circuit according to claim 1, wherein at least one of the first current source and the second current source comprises a linear current source.

3. The lighting circuit according to claim 2, wherein the linear current source comprises a temperature-dependent driver.

4. The lighting circuit according to claim 2, wherein the linear current source comprises a temperature-independent driver.

5. The lighting circuit according to claim 2, wherein the compensation resistor is connected in parallel to the current source of the primary set of light-emitting diodes.

6. The lighting circuit according to claim 2, wherein the compensation resistor is connected between the primary set of light-emitting diodes and the secondary set of light-emitting diodes.

7. The lighting circuit according to claim 6, wherein the compensation resistor is connected between the primary set of light-emitting diodes and a current sense resistor of the second current source of the secondary set of light-emitting diodes.

8. The lighting circuit according to claim 1, further comprising:
another set of primary light-emitting diodes to output light of a third color, different from the first color and the second color.

9. A lighting arrangement for illuminating objects with light of a predefined color point, the lighting arrangement comprising at least one lighting circuit according to claim 1, wherein the primary and secondary sets of light-emitting diode of each of the at least one lighting circuit are chosen to emit, in combination, light of the predefined color point at an initial temperature, and wherein the flux ratio fixing arrangement of the lighting circuit is realized to maintain that color point at a temperature higher that the initial temperature.

10. The lighting arrangement according to claim 9, configured for illumination of food products, wherein the light-emitting diodes of the primary set of the lighting circuit emit light with a wavelength in a region about 660 nm; and the light-emitting diodes of the secondary set of the lighting circuit emit essentially white light.

11. The lighting arrangement according to claim 9, configured for illumination of plants, wherein the light-emitting diodes of the primary set of the lighting circuit emit light with a wavelength in a region about 740 nm; and the light-emitting diodes of the secondary set of the lighting circuit emit light with a wavelength in a region about 660 nm.

12. A lighting circuit comprising:
a primary set of light-emitting diodes to output light of a first color;
a secondary set of light-emitting diodes to output light of a second color; wherein a temperature-dependent reduction in the light output of the primary set of light-emitting diodes is greater than a temperature-dependent reduction in the light output of the secondary set of light-emitting diodes; and
a flux ratio fixing arrangement to maintain a substantially constant ratio between the light output of the primary set of light-emitting diodes and the light output of the secondary set of light-emitting diodes during a temperature-dependent overall reduction in light output of the primary and secondary sets of light-emitting diodes of the lighting circuit,
wherein the flux ratio fixing arrangement is configured to decrease a current through light-emitting diodes of the secondary set based on a drop in forward voltage over light-emitting diodes of the primary set of light-emitting diodes, or to increase a current through the light-emitting diodes of the primary set of light-emitting diodes based on a drop in forward voltage over the light emitting diodes of the secondary set of light-emitting diodes; and
wherein the flux ratio fixing arrangement comprises:
a first current source in series with the primary set of light-emitting diodes, for supplying a current to the primary set of light-emitting diodes;
a second current source in series with the secondary set of light-emitting diodes, for supplying a current to the secondary set of light-emitting diodes; and
a compensation resistor connected in parallel to the current source of the primary set of light-emitting diodes, wherein a resistance of the compensation resistor is constant and chosen based on the difference between the temperature-dependent reduction in light output of the primary set of light-emitting diodes and the temperature-dependent reduction in light output of the secondary set of light-emitting diodes.

13. The light circuit according to claim 12, wherein the flux ratio fixing arrangement further comprises:
a DC constant voltage supply parallel across the series connection of the primary set of light-emitting diodes and the first current source, and parallel across the series connection of the secondary set of light-emitting diodes and the second current source.

14. A lighting circuit comprising:
a primary set of light-emitting diodes to output light of a first color;
a secondary set of light-emitting diodes to output light of a second color; wherein a temperature-dependent reduction in the light output of the primary set of light-emitting diodes is greater than a temperature-dependent reduction in the light output of the secondary set of light-emitting diodes; and
a flux ratio fixing arrangement to maintain a substantially constant ratio between the light output of the primary set of light-emitting diodes and the light output of the secondary set of light-emitting diodes during a temperature-dependent overall reduction in light output of the primary and secondary sets of light-emitting diodes of the lighting circuit,
wherein the flux ratio fixing arrangement is configured to decrease a current through light-emitting diodes of the secondary set based on a drop in forward voltage over light-emitting diodes of the primary set of light-emitting diodes, or to increase a current through the light-emitting diodes of the primary set of light-emitting diodes based on a drop in forward voltage over the light emitting diodes of the secondary set of light-emitting diodes; and
wherein the flux ratio fixing arrangement comprises:
a first current source in series with the primary set of light-emitting diodes, for supplying a current to the primary set of light-emitting diodes;
a second current source in series with the secondary set of light-emitting diodes, for supplying a current to the secondary set of light-emitting diodes; and
a compensation resistor connected between the primary set of light-emitting diodes and the secondary set of light-emitting diodes, wherein a resistance of the compensation resistor is constant and chosen based on the difference between the temperature-dependent reduction in light output of the primary set of light-emitting diodes and the temperature-dependent reduction in light output of the secondary set of light-emitting diodes.

15. The light circuit according to claim 14, wherein the flux ratio fixing arrangement further comprises:
a DC constant voltage supply parallel across the series connection of the primary set of light-emitting diodes and the first current source, and parallel across the series connection of the secondary set of light-emitting diodes and the second current source.

* * * * *